United States Patent Office.

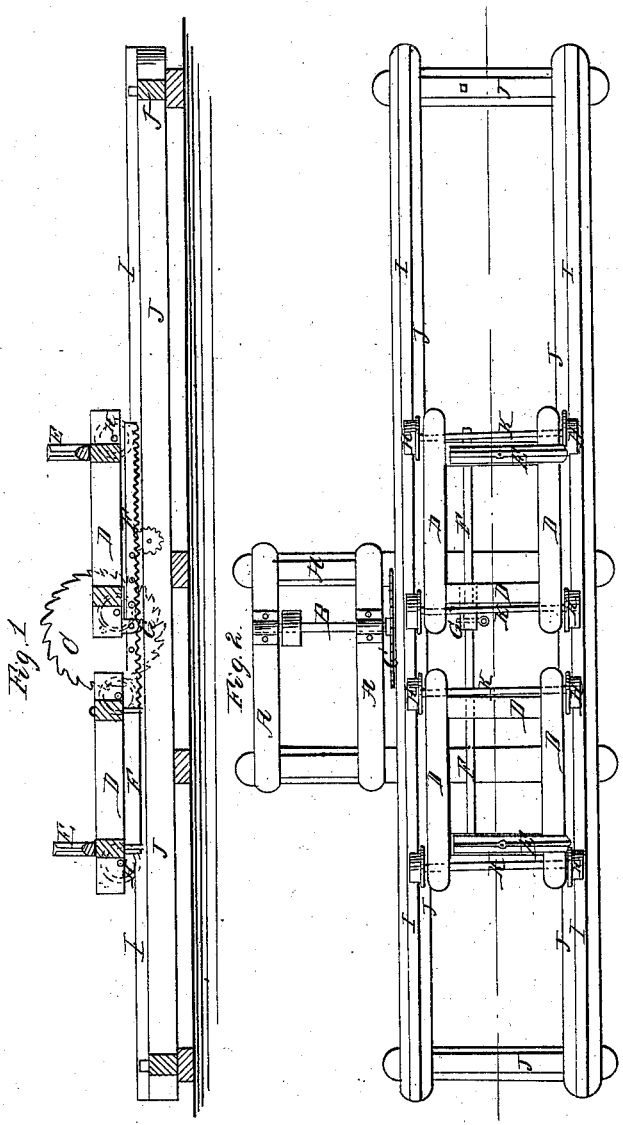

JOHN ORM, OF PADUCAH, KENTUCKY.

Letters Patent No. 81,673, dated September 1, 1868.

IMPROVEMENT IN CIRCULAR-SAW MILLS.

The Schedule referred to in these Letters Patent and making part of the same.

TO ALL WHOM IT MAY CONCERN:

Be it known that I, JOHN ORM, of Paducah, in the county of McCracken, and State of Kentucky, have invented a new and useful Improvement in Circular-Saw Carriages; and I do hereby declare that the following is a full, clear, and exact description thereof, which will enable others skilled in the art to make and use the same, reference being had to the accompanying drawings, forming part of this specification.

Figure 1 is a vertical longitudinal section of the carriage-way and carriage of a circular-saw mill illustrating my improvements.

Figure 2 is a top view of the same.

Similar letters of reference indicate corresponding parts.

My invention has for its object to improve the construction of the carriages of circular-saw mills, so as to make them more convenient and effective in operation; and it consists in the manner in which the cars or trucks of the carriage are coupled to each other, and in the manner in which the axles of the said trucks are combined with the truck-frames, as hereinafter more fully described.

A is the saw-frame, B is the shaft, and C is the saw, all of which parts are constructed and arranged in the usual manner.

D are the truck-frames, two or more of which are used, and to which the head-block E is attached in the ordinary manner. F is the toothed rack, by which motion is communicated to the carriage, and to which the car or truck-frames D are attached.

One of the truck-frames D is securely and permanently bolted or otherwise attached to the said rack F. The other truck-frame or frames are adjustably secured to the said toothed rack F, so that the length of the carriage may be adjusted according to the length of the logs to be sawn.

G is the coupling, by which the adjustable truck-frame or frames are secured to the toothed rack F. The coupling G is securely attached to the truck-frame, and is formed with downwardly-projecting ears, through which and through the said toothed rack F, passes a bolt, so that the said frame may be readily detached and adjusted as required, according to the length of the log to be sawn.

The truck-frames D are mounted upon wheels H, which roll along the rails I of the carriage-way J. The wheels H of the carriage are flanged, and are so arranged upon their axles, that the distance between the outer sides of the flanges of each pair of wheels may be three-eighths of an inch, more or less, than the distance between the inner sides of the rails, so that the said trucks may have a slight lateral movement.

K are the axles of the wheels H, and which are secured to the truck-frames D, in a slightly-inclined position, as shown in fig. 2, the ends of said axles that are towards the saw C, being set a little in the rear of their other or outer ends.

By this construction, as the carriage is fed forward towards the saw, the flanges of the wheels will be pressed against the side of the inner rail of the carriage-way, and when the carriage is running back, the flanges of the outer wheels will be pressed against the side of the outer rail, moving the log laterally from the saw, and preventing the log from being scarred by the saw while the carriage is being run back.

I claim as new, and desire to secure by Letters Patent—

Adjustably connecting one or more of the truck-frames D to the toothed rack F, by means of the coupling G, as herein shown and described and for the purpose set forth.

JOHN ORM.

Witnesses:
GEO. LANGSTAFF,
WILSON THOMPSON.